US012591703B2

(12) United States Patent
Cheng et al.

(10) Patent No.: US 12,591,703 B2
(45) Date of Patent: Mar. 31, 2026

(54) METHOD AND SYSTEM FOR FORMAT PRESERVING OF DATES

(71) Applicant: THALES DIS CPL USA, INC, Austin, TX (US)

(72) Inventors: Janice Cheng, San Jose, CA (US); Stephane Duhamel, Santa Cruz, CA (US); Rajesh Gupta, San Jose, CA (US)

(73) Assignee: THALES DIS CPL USA, INC., Austin, TX (US)

( * ) Notice: Subject to any disclaimer, the term of this patent is extended or adjusted under 35 U.S.C. 154(b) by 60 days.

(21) Appl. No.: 18/432,472

(22) Filed: Feb. 5, 2024

(65) Prior Publication Data

US 2025/0252205 A1     Aug. 7, 2025

(51) Int. Cl.
G06F 21/62 (2013.01)
G06F 21/60 (2013.01)
H04L 9/32 (2006.01)

(52) U.S. Cl.
CPC ........ G06F 21/6227 (2013.01); G06F 21/602 (2013.01); H04L 9/3213 (2013.01)

(58) Field of Classification Search
CPC ... G06F 21/6227; G06F 21/602; H04L 9/3213
See application file for complete search history.

(56) References Cited

U.S. PATENT DOCUMENTS

| | | | |
|---|---|---|---|
| 2015/0096039 A1* | 4/2015 | Mattsson | G06F 21/64 |
| | | | 726/26 |
| 2018/0189502 A1* | 7/2018 | Kumar | H04L 9/0863 |
| 2022/0198059 A1* | 6/2022 | Hatcher | G06F 21/606 |

FOREIGN PATENT DOCUMENTS

EP     2854068 A1     4/2015

OTHER PUBLICATIONS

International Search Report (PCT/ISA/210) and Written Opinion (PCT/ISA/237) mailed on Mar. 31, 2025 by the European Patent Office as the International Searching Authority for corresponding International Application No. PCT/US2025/013685—[19 pages].

* cited by examiner

*Primary Examiner* — Ayoub Alata

(57) ABSTRACT

Provided is a system and method for format preserving tokenization of calendar dates, whereby disparate software connectors of a product suite each receive parameters from a global policy, individually generate a look-up date table from these parameters, shuffle the date tables in a reproduceable manner in accordance with the policy, and then tokenize to produce a shuffled date table, and detokenize sensitive date data with it separately. The connectors are a family of software components associated with a product suite that integrate applications and databases with encryption, tokenization and cryptographic key operations. The shuffled date table is uniquely and locally generated on a connector to support cross platform integrations of various disparate containers, each with their own programming language, Application Programming Interface (API), and user supplied information. Other embodiments disclosed.

14 Claims, 9 Drawing Sheets

400

| Index | Date Offset | Date |
|---|---|---|
| 0 | 2 | 1/3/2000 |
| 1 | 4 | 1/5/2000 |
| 2 | 1 | 1/2/2000 |
| 3 | 0 | 1/1/2000 |
| 4 | 3 | 1/4/2000 |
| ⋮ | ⋮ | ⋮ |
| n | 25 | 2/1/2002 |

| Index | Date Offset | Date |
|---|---|---|
| 0 | 0 | 1/1/2000 |
| 1 | 1 | 1/2/2000 |
| 2 | 2 | 1/3/2000 |
| 3 | 3 | 1/4/2000 |
| 4 | 4 | 1/5/2000 |
| ⋮ | ⋮ | ⋮ |
| n | n | 1/1/2005 |

COMPUTING PLATFORM 800

PROCESSING COMPONENT

802

OTHER PLATFORM COMPONENTS

804

STORAGE MEDIUM

800

COMMUNICATIONS INTERFACE

806

STORAGE MEDIUM 700

COMPUTER EXECUTABLE INSTRUCTIONS

702

METHOD AND SYSTEM FOR FORMAT PRESERVING OF DATES

TECHNICAL FIELD

The present invention relates generally to cryptography, software security, data privacy and more particularly, to tokenization techniques for replacing calendar dates in sensitive data with unique identification symbols.

BACKGROUND

The Payment Card Industry Data Security Standard (PCI DSS) is a widely accepted set of policies and procedures intended to optimize the security of credit, debit and cash card transactions and protect cardholders against misuse of their personal information. PCI DSS was designed to prevent cybersecurity breaches of sensitive data and reduce the risk of fraud for organizations that handle payment card information. PCI and other security standard mandates that all personally identifiable information must be encrypted or tokenized Format-preserving tokenization (FPT) and Format-preserving encryption (FPE) are two different but similar techniques to transform data and retain data privacy. Both FPT and FPE are data security tools that focus on protecting sensitive data, such as primary account numbers or personally identifiable information (PII), from theft or exposure. This is done to minimize the effects of data breaches and to achieve compliance with key requirements of data privacy laws such as PCI DSS. FPT and FPE also share the same "data-centric" approach to security, meaning data is protected at the element or field level, rather than protecting whole files, data-bases, cloud instances, or storage resources.

One problem solutions providers of encryption product suites often face with respect to managing PCI DSS compliance is handling calendar date data. Proper formatting and storage of calendar dates is an issue; for example, how the month, day, year, range are ordered, coded and reproduced across various applications. Moreover, strict PCI compliance dictates that encryption is not allowed for date data. For PCI compliance purposes and for enterprise security, customers of these providers need to be able to tokenize or anonymize calendar date fields in their internal database systems. But dates must be tokenized in such a way that they conform to a certain range, format and be valid dates. Such effort is beyond a simple encryption algorithm, which requires innovation and logic built into their proprietary algorithms to preserve range, format and ensure that the resulting date is valid.

Existing format preserving solutions have difficulty in adequately preserving calendar dates in the correct range across various components that integrate applications and databases with core encryption, tokenization, and key operations. Moreover, format preservation of date data is a challenge because tokenization is currently a centralized service that is designed and hardened with fault tolerance, scaling, and failover considerations. Although generated in a centralized manner, tokens can be used indefinitely without the need to retokenize, but this is because tokens are generated by a centralized server, which doesn't require rotation or management of encryption keys.

Furthermore, format preservation of date data needs to be interoperable across various components supported in the entire data protection product suite from language specific Software Development Kits (SDKs) to existing Vaultless tokenization Virtual Machines to newer encryption container solutions, such as those offered by Docker and orchestrated container systems such as Kubernetes. For example, one data encryption product suite may encompass multiple providers on various platforms, each having components with differing SDKs running native to a particular programming language, where these components are coupled to other containers with their own SDKs and languages, such as C, C++, Java, .NET and so on, each needing to perform tokenization, alone or in conjunction with encryption. They may also need to connect to virtual machines (VMs) performing tokenization operations that connect to other containers or cloud access security brokers (CASBs) and proxies responsible for their own tokenization and specific encryptions, such as XCBC and XECB.

Some tokenization solutions require a central server to tokenize and detokenize data. For example, U.S. Patent Application US2022/0058636 A1 discloses a tokenization platform that utilizes smart contracts for facilitating token-based transactions for items is disclosed. However, it does not necessarily address issues calendar date tokenization. The system includes an item management system that generates a virtual representation of an item based on item attributes thereof and that generates a smart contract that defines conditions for self-executing a transaction relating to the item. If facilitates token-based transactions by generating a virtual representation of the item based on the set of item attributes and generating a smart contract that defines a set of verifiable conditions that must be satisfied in order to self-execute a transaction relating to the virtual representation. It does not however address a non-centralized approach to tokenization that is interoperable across components.

Some solutions support tokenization for generic plaintext. For example, U.S. patent U.S. Pat. No. 8,763,142B2 is directed to use of tokens as substitutes for confidential information in corporate enterprise systems. Other solutions use format preserving encryption for date tokenization, or implement existing solutions that format date and time. For example, U.S. Patent Application US2007/0276765A1 describes methods for performing settlement of token access of secured transactions and batch processing of token transactions. Authorization for transactions can be stored for batch settlement. A routing means is contemplated whereby centralized decryption can be implemented to provide centralized key management or centralized of other encryption algorithms or information. Secure transaction modules at various gateways, or elsewhere in the processing network, are configured to share generated data with one another or provide them to a central repository. Here too, component tokenization appears to rely on a central tokenization server that does not take into account limitations of transaction performance caused with centrally located tokenization.

What is needed instead is a system solution that focuses on tokenization of calendar dates across across a software product suite where one component can be detokenized with a different system component at that same location or different location regardless of how much time has passed and with no platform component constraints, dependencies or limitations on a centralized server.

All of the subject matter discussed in this Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art.

Instead, the discussion of any subject matter in the Background section should be treated as part of the inventor's approach to the particular problem, which, in and of itself, may also be inventive.

SUMMARY

Provided herein is a solution that allows customers to replace sensitive data with equivalent non-sensitive information without compromising security. The solution is reversible in that a customer can substitute and store non-sensitive token data on disk to minimize exposure and only allow certain users or processes to retrieve the real, sensitive data on a time-limited basis. The solution is format-preserving in that the substitution date token is generated in the same format as the original date and within a specified range to allow insertion into an existing database schema thereby preserving constraints and existing application workflows.

In some embodiments, a method and system for format preserving tokenization of calendar dates is provided, whereby disparate software connectors of a product suite each receive parameters from a global policy, individually generate a look-up date table from these parameters, shuffle (or scramble) the look-up date tables in a reproduceable manner in accordance with the policy, and then tokenize and detokenize sensitive data using the shuffled data table. Here, connectors are a family of software components associated with a product suite that integrate applications and databases with encryption, tokenization and cryptographic key operations.

The shuffled date table is unique to each software connector for performing local tokenization and detokenization of dates. The date table is uniquely generated to support cross platform integrations of various disparate containers, each with their own programming language, Application Programming Interface (API), and user supplied information to configure the connector for that container. Each individual connector locally creates its own shuffled date table (i.e., scrambled look-up table) from parameters in the policy, thereby allowing the container to locally perform consistent and reproduceable tokenization and detokenization of calendar date data that container handles by way of it's shuffled data table. In this manner, different container types can be communicatively coupled to each other to tokenize/detokenize dates with equivalent results.

in some embodiments, a system for format preserving tokenization of calendar dates in data comprising a Computer Agent with centrally defined global parameters in a global protection policy, and one or more Connectors communicatively coupled to the Computer Agent for managing and distributing said policy to the one or more Connectors that convert and store non-sensitive token date data on a hard disk. The one or more Connectors performs steps for: reading said global parameters from said policy; generating a date look-up table using said global parameters; scrambling said look-up table by way of a quick unsort to ensure secrecy and produce a shuffled data table; and selectively: tokenizing date entries of sensitive date data via said shuffled data table to produce said non-sensitive token date data; and detokenizing said non-sensitive token date data via said shuffled data table to produce said date entries of sensitive date data.

In some embodiments, a Connector for format preserving tokenization of calendar dates in data is provided. It individually perform steps of reading global parameters from a policy; generating a date look-up table using said global parameters; and scrambling said look-up table by way of a quick unsort to ensure secrecy and produce a shuffled data table. It selectively tokenizes date entries of sensitive date data via said shuffled data table to produce non-sensitive token date data; and detokenizes said non-sensitive token date data via said shuffled data table to produce said date entries of sensitive date data. The data look-up table and shuffled data table are pinned in system memory and not stored on said hard disk, and encrypted with a key unique to each installation of said one or more Connectors.

BRIEF DESCRIPTION OF THE DRAWINGS

The accompanying drawings, which are incorporated in and constitute a part of this description, illustrate embodiments consistent with the invention and, together with the description, serve to explain the principles of the invention.

FIG. 4B depicts an initial date table in accordance with embodiments;

FIG. 4C depicts a random date table after quick unsort in accordance with embodiments;

Specific embodiments in this invention have been shown by way of example in the foregoing drawings and are hereinafter described in detail. The figures and written description are not intended to limit the scope of the inventive concepts in any manner.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Briefly, the term "tokenization" is generally the process of replacing sensitive data with unique identification symbols. It exchanges sensitive data for non-sensitive data called "tokens" that can be used in a database or internal system without revealing the sensitive data. While there are no tokenization standards in the industry, most tokenization solutions fall into one of two architectures: vaultless or vaulted tokenization.

Herein, the term "connector(s)," is/are considered a software component designed to bridge the communication gap between applications, systems, or services. Connector types include database connectors, data connectors, message connectors, event connectors, procedural connectors, calling connectors and Applications Programming Interface (API) connectors. Their primary objective is to facilitate smooth integration of applications and the flow of data between these components, to efficiently synchronize data securely and effortless.

Figure 1:
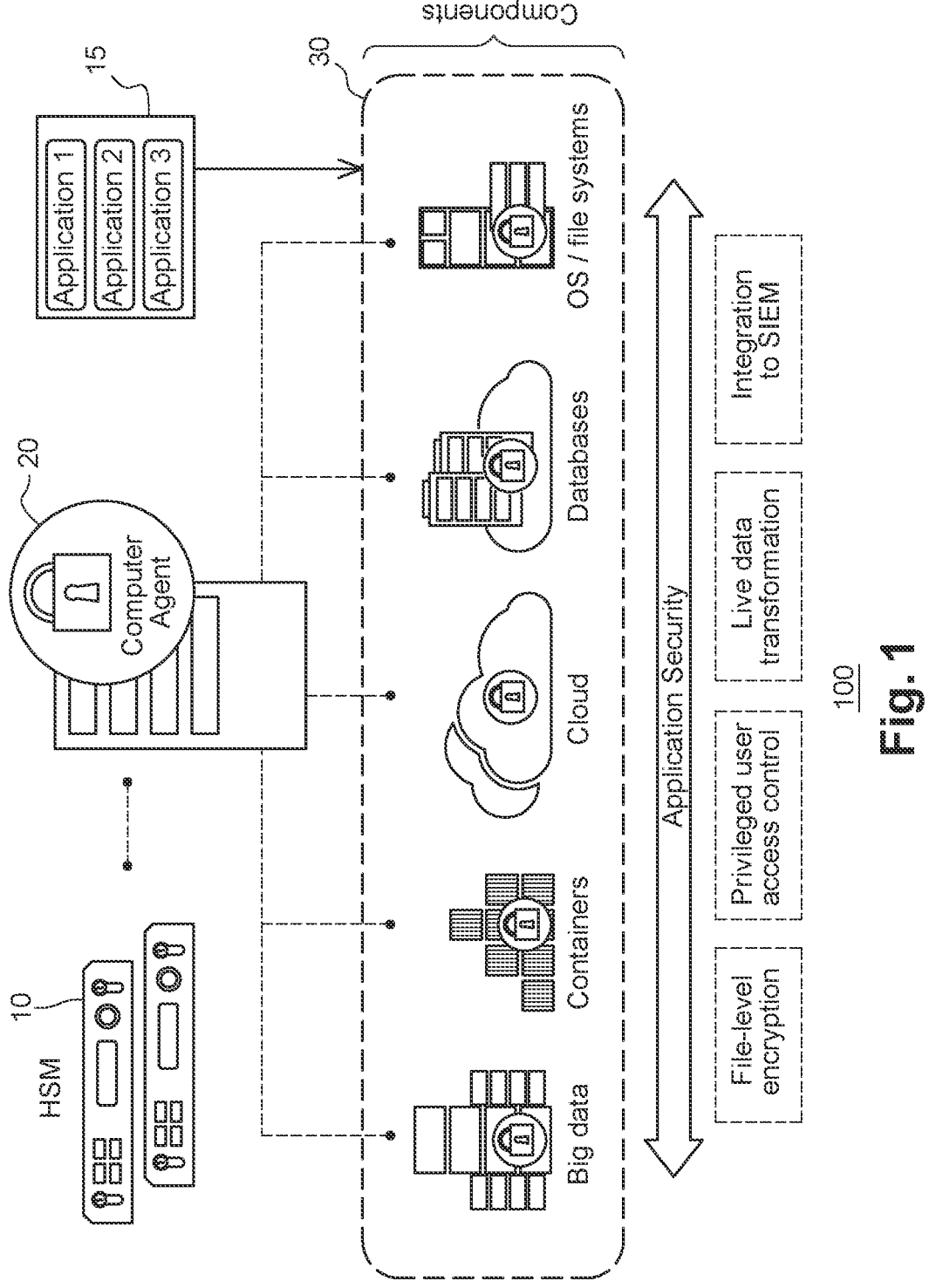
FIG. 1 depicts a data-centric system for safeguarding and securing data that includes format preserving tokenization of calendar dates in accordance with embodiments.

Referring to FIG. 1 a data-centric system 100 is shown for safeguarding and securing data as it moves from networks to applications and the cloud. The system 100 integrates centralized key management with data protection and granular access controls. It discovers and classifies sensitive data, combat external threats, guard against insider abuse, and establish persistent controls, even when data is stored in the cloud or in any external provider's infrastructure for on-prem and cloud-based data. In support of key lifecycle management, hardware and virtual appliances are leveraged, which are communicatively coupled to system components. The Hardware Security Module (HSM) 10 is one exemplary physical device to provide secure management of sensitive data, such as keys, which can be configured as a root of trust for the system 100 and for verifying chains of key encryption keys.

The Computer Agent 20 delivers data-at-rest encryption, privileged user access controls and detailed data access audit logging. It does this to reduce security risk and maintain strong data security. The Computer Agent 20 can be deployed or installed to execute within major infrastructure components 30 in order to secure sensitive data across changing environments and increasing threats, for example, Big Data, Containers, Cloud, Databases and Operating System (OS) File Servers. This is necessary because the typical enterprise today uses multiple IaaS or PaaS providers, along with numerous SaaS applications, big data environments, container technologies, and their own internal virtual environments.

Among other security features and data protection services, the Computer Agent 20 provides for calendar date tokenization of data shared, stored or distributed amongst one or more of these infrastructure components 30, each of which may host or run applications 15. The applications 15 may be local user applications requiring date tokenization, for example, compliance with PCI DSS, such as word processing programs, spreadsheet programs, and collaboration tools, application software, or endpoint management applications and administrative programs executing on any of components 30, or any other type of computer or server-based application. These applications 15 can run on the components 30, including, but not limited to, virtual machines, containers, databases, files systems and within the cloud.

Here, data and date tokenization included with the encryption services for the connectors 40 dramatically reduces the cost and effort required to comply with security policies and regulatory mandates like PCI DSS while also making it simple to protect other sensitive data including personally identifiable information (PII). With format-preserving tokenization, a token is exchanged for the original value, but the token respects the format of the original value. If the format of the token is the same as the original value, then the tokenization process is format-preserving. Tokenization of application date data occurs by way of Connectors (described next in conjunction with FIG. 2) associated with Components 30 and Computer Agent 20 working together, whether in the data center, big data environments or the cloud.

Figure 2:
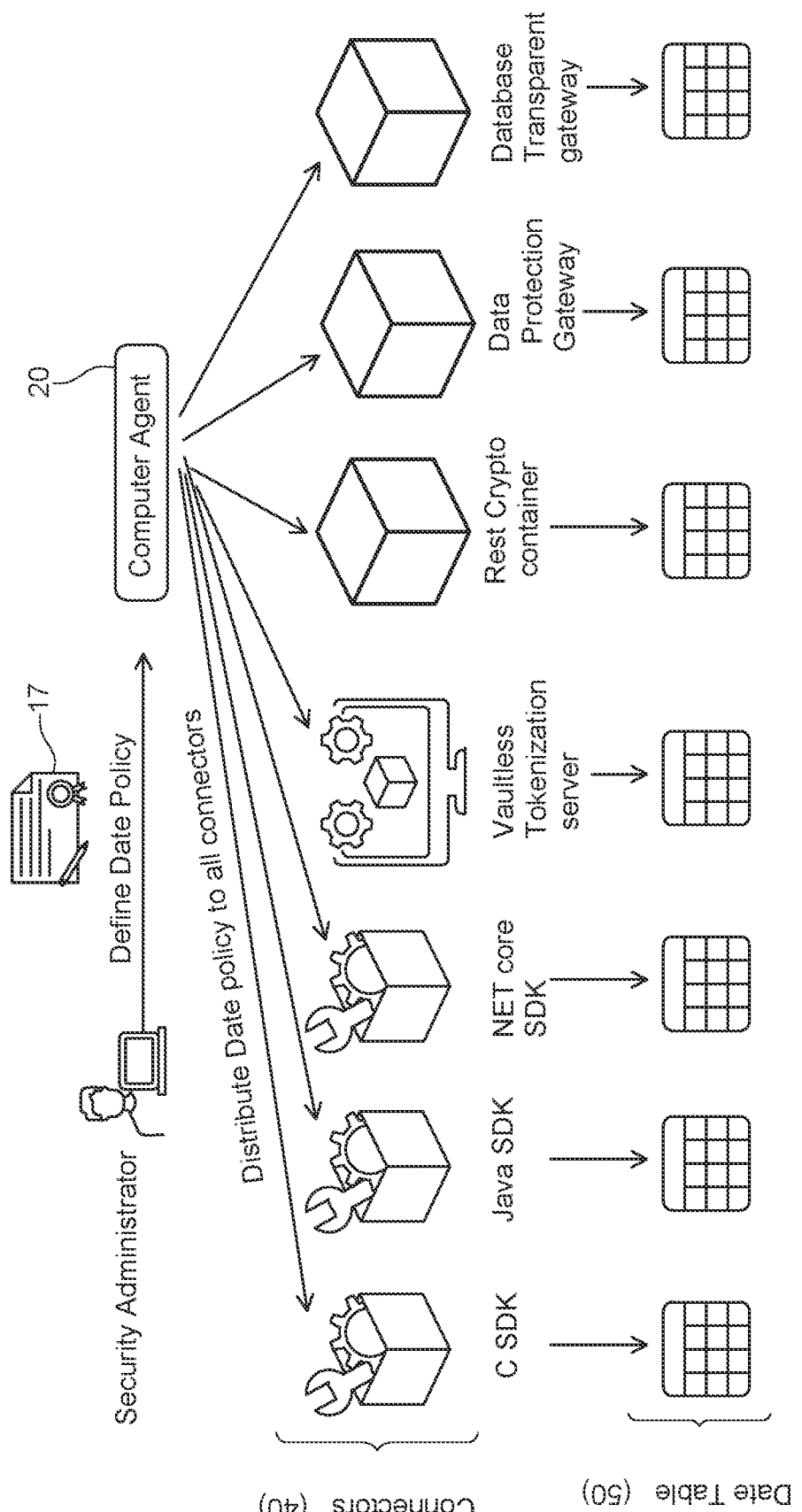
FIG. 2 depicts definition and distribution of a global date policy to connectors in accordance with some embodiments.

FIG. 2 depicts definition and distribution of a global date policy to connectors in accordance with some embodiments. It shows a group of Connectors 40 associated with the Computer Agent 20 and Components 30 of FIG. 1 that each independently generate a Date Table 50 in accordance with some embodiments. The Connectors 40 are disparate in that they comprise one or more of a C SDK, a C++ SDK, aJava SDK, a .NET core SDK, a Vaultless Tokenization server, a RESTful Crypto container, Data Protection Gateway and a Database Transparent gateway. Other connectors for virtual machines (VMs) performing tokenization operations that communicate with other containers or cloud access security brokers (CASBs) and proxies responsible for their own tokenization and specific encryptions, such as XCBC and XECB, are supported. Connectors 40 connect with the Computer Agent 20 to retrieve centrally protected keys to be used for encryption and a global policy for tokenization In one arrangement, the Computer Agent 20 may be a remote manager to support cross-platform integration of connectors 40, and for clients to access and configure the service components and services (e.g., Big data, Containers, Cloud, Databases, File Systems, etc.) of system 100 (in FIG. 1). The Computer Agent 20 provides a unified management console that enables users (e.g., admins, solutions providers, vendors, or clients to develop applications using the one or more Connectors 40) to discover and classify sensitive data, and protect data using the integrated set of format preserving date Connectors across on-premises data stores and multi-cloud deployments Here, for example, a security administrator defines a global date policy 17 that is registered and stored on the Computer Agent 20, which then distributes and shares this date policy 17 with all the installed connectors. This can occur automatically as part of an installation process for each connector or via manual operations. As an example, one component of the Computer Agent 20 may be directed to encryption services that may encompass multiple software providers on various platforms each requiring their own connector 40 associated with a specific Software Development Kits (SDK), where each one runs native to particular programming languages (e.g. C, C++, Java, .Net, etc.).

The global date policy 17 includes date parameters that each connector 40 uses to generate their own specific date look-up table 50. The policy 17 is a collection of rules that govern data access and encryption supplemented with date parameters. It specifies actors (e.g., users, groups and processes that are permitted/denied access to protected data), and actions authorized users are allowed to perform, for example, create/delete, read/write, decrypt, modify permissions, and so on Policy rules are processed sequentially. If the criteria of rule one is not met, the policy enforcement engine moves on to the second rule and so on.

When creating a policy, the system administrator (or user of a service by way of the Computer Agent 20) specifies security rules, key rules, and data transformation rules that apply to the policy. At least one key or security rule is generally required to be added to a policy. The Computer Agent 20 distributes the policy 17 to all connectors 40, or containers, and the key is used to encrypt the policy and data. For date tokenization/detokenization, the user specifies a date format, a valid date range (optional), an encryption key and a tweak from the Computer Agent 20. Here, the term "tweak" is a numeric seed value for a Random Number Generator (RNG). It is used to intentionally seed the RNG with a value in order for the container to purposefully generate a reproduceable pseudo random number when needed. This reproducibility of the random number ensures that each connector 40 will be able to generate a scrambling order for the look-up tables 50 that is consistent across each of the connectors 40 individually, and accordingly across containers using the respective connector.

Each Connector 40 independently generates its own look-up table 50 during am initialization phase with the parameters specified in the policy 17; namely, the date format, the date range and the tweak. They also specify an encryption, cipher suite or key from the global policy 17. These four parameters uniquely specify how the look-up table is generated, and because these parameters are distributed to each connector, that allows each connector, with a same tweak seeded RNG, to generate the same date table with a same scrambling order as other connectors. This way, regardless of where the container (and associated connector 50) is installed or later resides, it can tokenize and detokenize date data to a consistent set of dates.

Each connector 40 scrambles its lookup table 50 within its container via a quick unsort algorithm to ensure secrecy. The algorithm receives as input a set of parameters and produces a scrambling order for the date table as output. With the same four parameters (e.g., date forma, range, encryption and key) each connector 40 can generate its date lookup tables 50 in a repeatable and reproduceable manner, no matter the target platform of the container, or how much time has passed to safeguard a customer's data. Notably, lookup tables 50 are configurable as two-way or one-way. In a two way configuration the data can be tokenized or detokenized. In a one way configuration only tokenized for anonymization use. Again, all the connectors 40 independently generate the same date table (e.g. initial date table, shuffled date table (for tokenization), and shuffled date table (or scrambled look-up table)). So for example, if one container 30 tokenize with the Java SDK connector 40, another container can detokenize the same date data with a Data Protection Gateway connector 40. Similarly, date data tokenized with a REST crypto container, can be detokenized with a C++ connector.

The interoperability of connectors 40 amongst different container types of components 30 in the system 100 is a unique solution that broadens leverage and practical use for a centralized product. It supports the Central Area Data Processing (CADP) use case of central management and protect/reveal policies. The parameters are centrally defined on the Computer Agent 20 (e.g. HSM resource manager, encryption services manager, etc.) as a global protection policy, which is automatically distributed to containers and system components 30. This allows it to encrypt with one connector, and decrypt with any other connector. Allowing the connectors to individually generate their own data tables for tokenization is advantageous from a time and processing viewpoint. Whereas a centralized server would otherwise generate, replicate and distribute large size date tables to connectors requiring large data bandwidth with slow response time, here, the server need only distribute the lower size policy with parameters to each connector that then independently generates the date tables, thereby requiring less data bandwidth and faster response time.

Figure 3:
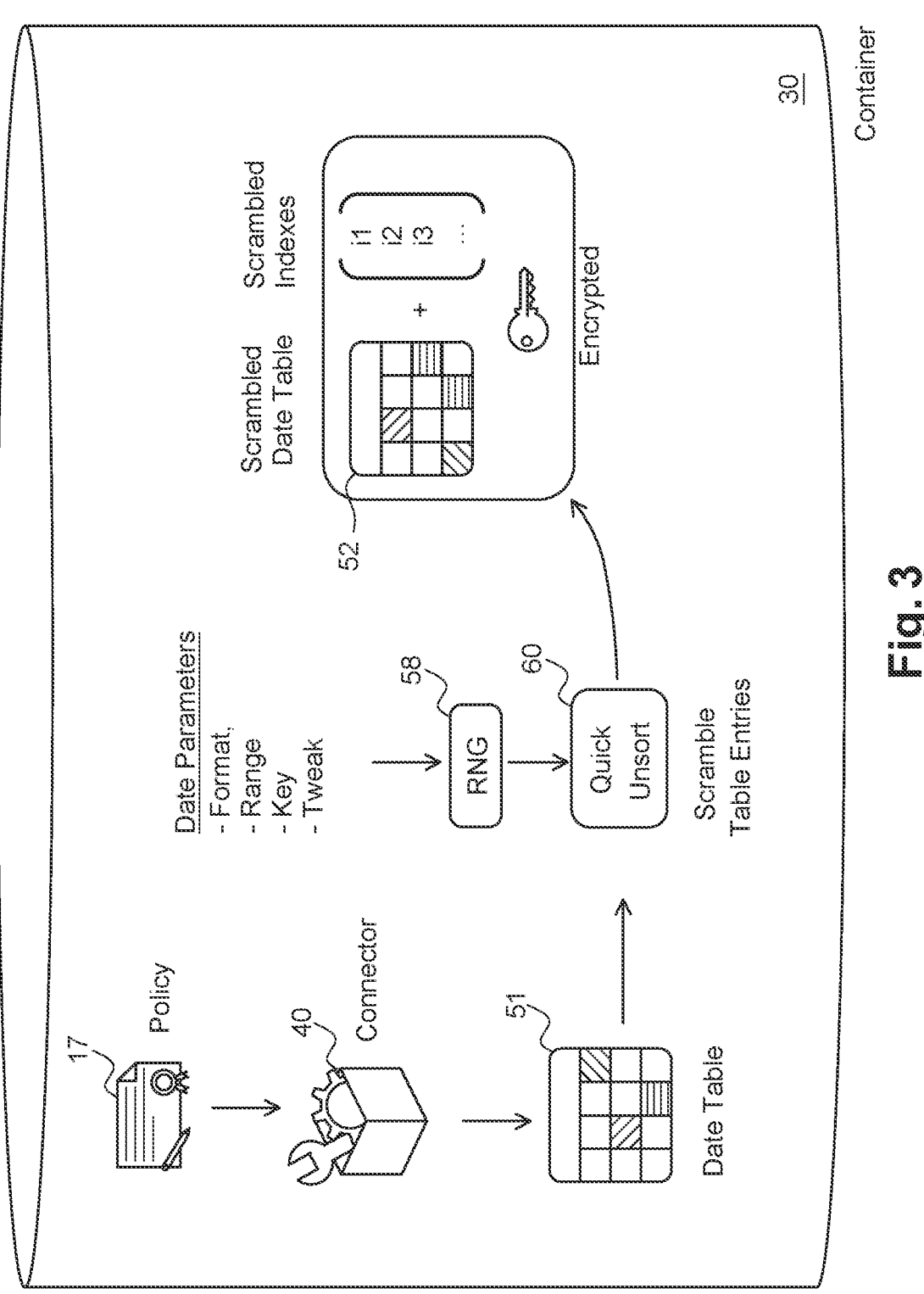
FIG. 3 illustrates visual steps for generating and scrambling a date table in accordance with some embodiments.

FIG. 3 illustrates steps associated with the generation of a look-up table, also referred to as a date table. Here, the connector 40 associated with container 30 retrieves data parameters from the policy 17, which include the data format, date range, encryption key and tweak. The connector 40 generates all possible dates in that date range into a date table 51 on that connector. The quick unsort proprietary algorithm (described ahead) 60 shuffles an ordering of the date table 51 with the date range, the encryption key, and the tweak to produce the shuffled date table 52. The encryption key and tweak serves as the seed for the Random Number Generator (RNG) 58 to perform the scrambling. The result of the scrambling operation by quick unsort 60 produces a shuffled date table 52 and list of shuffled indexes list. These can also be encrypted in system memory via the key retrieved from the policy, or a different key local to the container or connector. For additional security, generated date tables are pinned in memory and never stored on disk and then encrypted with a unique key specific to each installation.

On a tokenization, a plaintext date is 1) computed into an Index for the shuffled date table 52 and then 2) the entry in the table position for that Index is returned to the user. The computation references the shuffled indexes list. This entry is the tokenized date data. The computation is performed using the quick unsort algorithm as shown. In some arrangements this is a proprietary codebook algorithm to support faster indexing speeds in comparison to encryption. Additional entropy for the codebook solution is provided by a user supplied tweak and the key supplied the Computer Agent 20.

Conversely, on a detokenization, the reverse occurs; a date token is searched for (looked up) in the shuffled detokenization date table 52 and then its position in that table is determined and returned as an index. The computation references the shuffled indexes list. The original date is computed from the index and returned to the user.

Figure 4A:
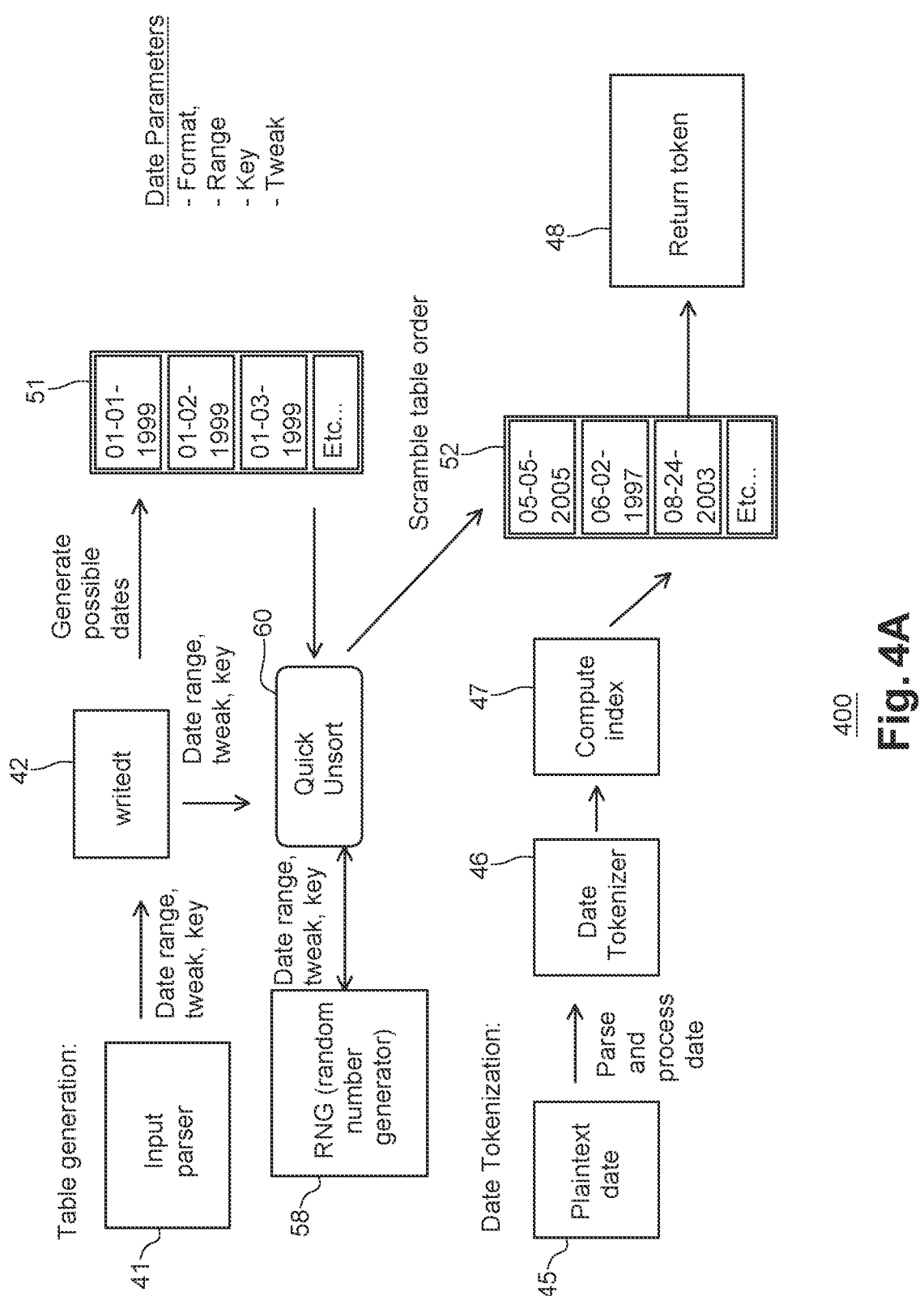
FIG. 4A illustrates lower level steps of FIG. 3 for date table generation suitable for use with tokenization in accordance with embodiments.

FIG. 4 illustrates a low-level diagram 400 for generating the date tables. These steps are performed individually by each connector associated a container. Here, the Input Parser module 41 of the container retrieves the data parameters comprising the date range, date format, encryption key and tweak, for instance, from the policy. The write date table (writedt) module 42 generates its date table 51 for all possible dates in the date range in the required format for that connector. The date parameters are also provided to the RNG 58 to generate a pseudo random array of table swap values (described ahead). The quick unsort 60 algorithm receives as input the date table 51, the date parameters, and the table swap values from the RNG to shuffled the table order. The tweak as the seed for the RNG 58 to provide the consistent and reproduceable random array of table swap values used for the scrambling. Accordingly, shuffled date tables generated across disparate connectors will be consistent amongst one another because the RNG is seeded with the same date parameters. Similarly here, when the container performs a tokenization, it produces a plain text date 45, which the date tokenizer 46 then parses and processes.

The date tokenizer 46 computes the index, takes a look and finds the entry in the shuffled date table 52 with the index, and then looks up and returns the token 48 to the caller. More specifically, as explained ahead in FIGS. 4B-4C in more detail, the date tokenizer 46 computes the offset of the date in the date range. It then finds the entry in the shuffled date table with the index equal to the offset. This entry is then transformed from an offset to the actual date by adding the offset to the start year and getting the day, month and year in plaintext.

Briefly, the quick unsort 60 algorithm is moderately based on the industry standard quick sort algorithm. The quick sort algorithm takes a table and sorts it into ascending or descending order. Quick sort takes two elements in the table and depending on whether one is larger than the other, decides whether or not to swap the elements. This is where the quick unsort differs. With quick unsort 60, the connector takes two elements (date entries) in the table for comparison, but instead of making a determination of whether to swap a position of the two elements (date entries) in the date table in ascending or descending order based on their value, it makes a pseudo random decision based on an output the Random Number Generator (RNG) 58. The pseudo random decision establishes whether to swap or not swap the elements. It is "pseudo" random because the seed generates a deterministic RNG output sequence. The result is that instead of sorting an out-of-order table into order, it takes an in-order date table and shuffles the date entries to be out of order. The shuffled date table (52) is unsorted with a pseudo random swap decision such that date entries are neither ascending nor descending in date.

Referring briefly to FIG. 4B, an initial date table 470 is shown in accordance with some embodiments. To generate the shuffled date table, the Computer Agent 20 starts by computing a number of dates (n) existing in a given date range (start year, end year). It creates the table 470 containing numbers from 0 to n in ascending order in an index column 71. These numbers (0 to n) correspond to the offset of each date in the date range 73, in the date offset column 72. Accordingly this creates an index entry column 71, a date offset column 72 and a date column 73. As one example, if the date range is 2001 to 2002, there are 730 possible dates, where the offset for the date Jan. 20, 2002 is 385 in that given date range (365+20). The date offset column 72 is shuffled with the quick Unsort algorithm and the new position of each record in the table 470 becomes its index in the index entry column 71, thereby producing the shuffled date table (52). This shuffling result is seen in FIG. 4C, and produces the shuffled date table 480 (corresponds to the shuffled date table 52) using quick unsort is shown. It is noted that the Computer Agent 20 does not store the actual date but rather only stores the offset (data in the date offset column 82) of the shuffled date table 480 (i.e., shuffled date table 52) in system memory (e.g., RAM, DDR, etc.) but not hard disc for long term storage. It also generates another table called a detokenization date table (not shown) by sorting the shuffled offsets in the offset column 82 in ascending order using quicksort.

Correspondingly, in some embodiments, a method for tokenization is provided. The method includes receiving a plaintext date and calculating its offset in the date range. The date tokenizer 46 (used for both tokenization and detokenization) then looks up a record located at that index from the index column 81 in the shuffled date table 480. It then transforms this record from an offset to the actual date by adding the offset to the first year of the date range and getting the day, month and year. An exemplary pseudo code to produce the offset is as follows:

```
get_date_offset(year, month, day):
offset=0
while(startyear< year)
```

-continued

```
    offset += daysperyear[startyear++];
    while(i=0; i < month)
        offset += dayspermonth[i++];
    offset += day
    return offset
```

Conversely, in some embodiments, a method for detokenization is provided. The method similarly includes the steps of receiving a date token and calculating its offset in the given date range. This is the same process as tokenization but uses the shuffled detokenization date table instead of the shuffled date table for lookup. On detokenization, the date tokenizer 46 produces a date token and calculates its offset in the date range. It then looks up the record located at that index in the shuffled detokenize date table. This record is transformed from a date offset to the actual date by adding the offset to the first year of the range and getting the day, month and year.

The improvement here over a previous quick unsort algorithm is in the way it seeds the random number generator to be repeatable. Previously the random number generator was seeded with vaultless token specific information, making the quick unsort algorithm unique per vaultless token instance. Here, the algorithm seeds the random number generator with specific inputs centrally controlled by the key and policy manager, for example, Computer Agent 20. The random number generator in quick unsort produces a same sequence of numbers (also referred to as the shuffled indexes list above) independently on each connector, and identical date tables can be generated on each connector independently.

The quick unsort 58 in conjunction with the aforementioned format preserving tokenization that uses connectors to locally generate date tables, provides significant performance improvements. Previously, customers, for example, users of an encryption suite of products in system 100 with their own connector 30 types, were required to set up their infrastructure for tokenization and detokenization by always going through a central vaultless tokenization server in order to get consistent tokenization and detokenization results between each application. This is because the date tables were different for each vaultless tokenization server instantiation.

Figure 5A:
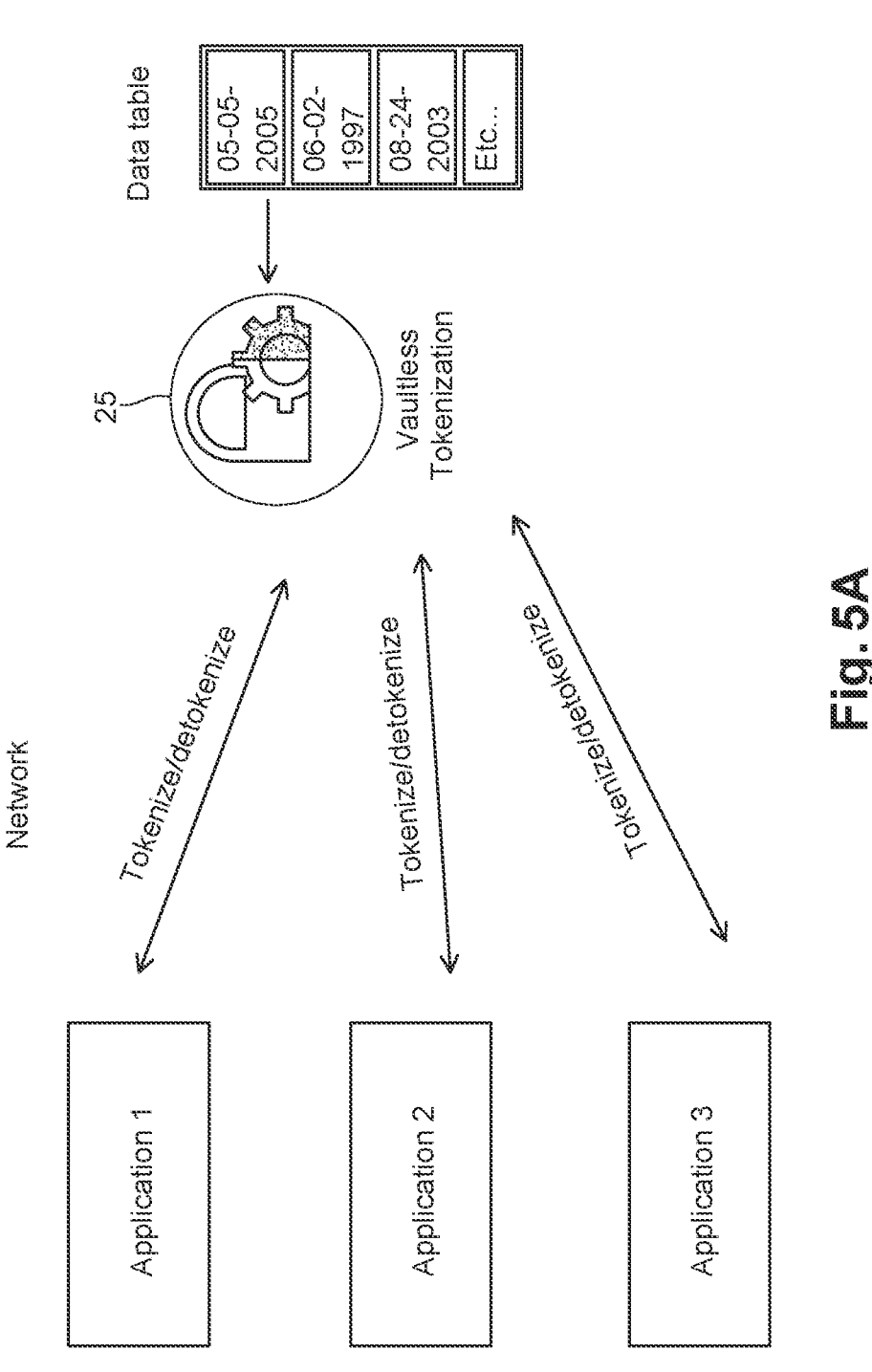
FIG. 5A illustrates disadvantages related to reliance and overhead associated with applications obtaining a date table over a network from a centralized vaultless server for tokenization and detokenization in accordance with embodiments.
Figure 5B:
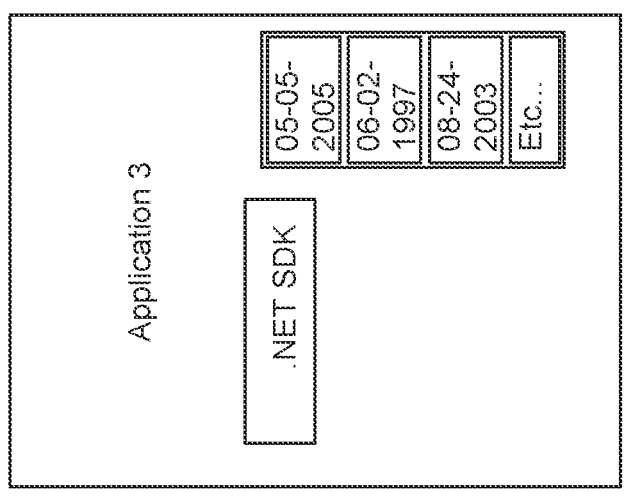
FIG. 5B illustrates advantages of connectors generating local date tables for applications allowing immediate use tokenization and detokenization without reliance over a network in accordance with embodiments.
Figure 5B:
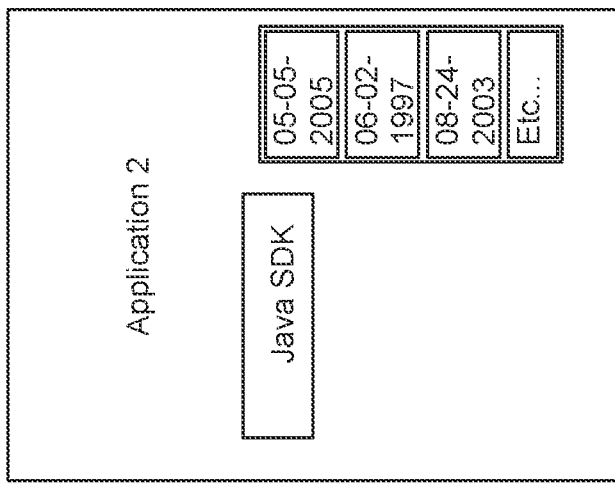
Figure 5B:
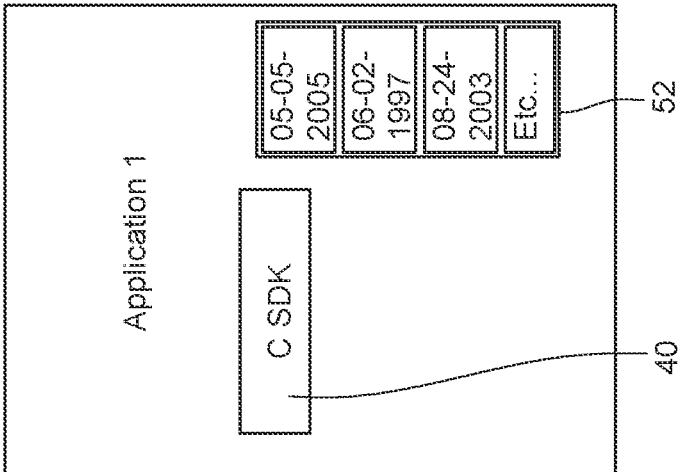

FIG. 5A illustrates a previous infrastructure arrangement using a centralized vaultless tokenization server instantiation. Here each application was required to communicate over the network to perform tokenization/detokenization. This resulted in slower tokenization and detokenization performance because each call must go over the network and incur a network delay penalty. With the improved quick unsort, customers can now skip the vaultless tokenization server and do tokenization and detokenization locally in each application, by way of the connectors associated with a respective container. As seen in FIG. 5B, each application will have its own connector 40 to independently and locally generate a shuffled date table 52 for tokenization. In this approach, users can setup infrastructure in this way where each application can generate an identical date table locally, eliminating the costly network roundtrip on each tokenization and detokenization call. Each application still produces consistent tokenization and detokenization results, and furthermore, interoperate with other applications via their connectors because the date tables generated at each application is guaranteed to be the same.

Advantages of the format preserving tokenization of date data described above allows for connectors across various applications and/or containers to perform encryption and decryption on data whilst maintaining compliance with data privacy laws and regulations. Also, the policy 17 can be defined centrally on the computer agent 20 and distributed automatically to every connector 30. Another advantage is data backup; namely, that so long as protection on the policy is maintained, the computer agent 20 can restore tokenized and encrypted data at any time in the future. The data is always available to be detokenized as long as the policy information, and corresponding data parameter inputs are backed up and available. Moreover, this type of codebook approach tends to be faster than encryption solutions then just tokenization in general. Customers don't need to change their schema or their code because the date range that they receive back from detokenization is guaranteed to be within their specifications. Moreover, security conscious customers can supply and provide their own tweaks for the RNS as additional entropy for the code book, which may be stored centrally. As previously mentioned, performance savings are observed because date tables are generated locally on a connector, rather than replicated, reproduced and distributed from a central location. Although policy distribution is centralized, the date table is not, and his saves time and cost due to overhead savings otherwise associated with customers having to coordinate communications amongst disparate connectors and containers for date tables.

In view of FIGS. 1-5, in some embodiments, a system 100 for format preserving tokenization of calendar dates in data comprising a Computer Agent 20 with centrally defined global parameters in a global protection policy 17, and one or more Connectors 30 communicatively coupled to the Computer Agent 20 for managing and distributing said policy 17 to the one or more Connectors 30 that convert and store non-sensitive token date data on a hard disk. The one or more Connectors 30 performs steps for: reading said global parameters from said policy 17; generating a date look-up table 51 using said global parameters; shuffling said date table by way of a quick unsort to ensure secrecy and produce a shuffled date table 52; and selectively: tokenizing date entries of sensitive date data via said shuffled date table 52 to produce said non-sensitive token date data; and detokenizing said non-sensitive token date data via said shuffled date table 52 to produce said date entries of sensitive date data. The data look-up table 51 and shuffled date table 52 are pinned in system memory and not stored on said hard disk, and encrypted with a key unique to each installation of said one or more Connectors 30. The Computer Agent 20 and one or more Connectors 30 comprise one or more processors and memory coupled to the one or more processors, wherein the memory includes one or more partitions and computer instructions which when executed by the one or more processors causes the one or more processors to perform said steps and operations.

In some embodiments, the tokenizing comprises: retrieving a date format, a date range, an encryption key and a tweak value from said global parameters 21 in said policy 17; generating said date lookup table 51 with all possible dates in said date format in the date range; seeding a Random Number Generator 58 with said date range, said encryption key and said tweak to produce a seeded RNG; and scrambling said date lookup table 51 in accordance with an output of said Random Number Generator 58.

In some embodiments, the quick unsort takes two date entries in the date lookup table 51 for comparison, and instead of deciding of whether to swap positions of the two date entries in ascending or descending order based on their value, the quick unsort makes a pseudo random decision based on an output of said seeded RNG to either swap said position or not swap positions of said two date entries. In some embodiments, the shuffled date table 52 is unsorted with a pseudo random swap decision such that date entries are neither ascending nor descending order.

In some embodiments, on tokenization, plaintext date is computed into an index for lookup in said shuffled date table 52; and an entry in a table position of said shuffled date table 52 is returned to the user as said non-sensitive token date data. In some embodiments, on on detokenization: said non-sensitive token date data is looked up in said shuffled date table 52 to identify its position therein; and said position is used to compute said plaintext date and returned to the user as said sensitive date data.

In some embodiments, the quick unsort 60 generates said individual look-up tables 51/52 independently on each connector rather than relying on a centralized server or database that generates and replicates a look-up table for distribution to said one or more Connectors 30.

In some embodiments, a container 40 associated with said one or more Connectors 30 determines whether data is personally identifiable information (PII); and if so, tokenizes date entries of sensitive data to produce non-sensitive token date data stored on said hard disk; and if not, does not tokenize date entries of non-sensitive data.

In some embodiments, said date table 51 and shuffled date table 52 is pinned in system memory such as physical RAM or virtual memory that is distinct and separate from said disk, or a storage device, such as a hard drive.

In some embodiments, the shuffled date look-up table 52 is configurable for two-way tokenizing and de-tokenizing data, and one-way tokenizing anonymous use-cases.

In some embodiments, said one or more Connectors 30 are selected from the set comprising: a C SDK, a C++ SDK, a Java SDK, a .NET core SDK, a Vaultless Tokenization server, a RESTful Crypto container, Data Protection Gateway and a Database Transparent gateway In some embodiments, a Connector 40 for format preserving tokenization of calendar dates in data is provided. It individually perform steps of reading global parameters from a policy 17; generating a date look-up table 51 using said global parameters; and scrambling said look-up table by way of a quick unsort to ensure secrecy and produce a shuffled look-up table 52. It selectively tokenizes date entries of sensitive date data via said shuffled date table 52 to produce non-sensitive token date data; and detokenizes said non-sensitive token date data via said shuffled date table 52 to produce said date entries of sensitive date data. The data look-up table 51 and shuffled date table 52 are pinned in system memory and not stored on said hard disk, and encrypted with a key unique to each installation of said one or more Connectors 30. The Connector is among one or more Connectors 30 communicatively coupled to a Computer Agent 20 for managing and distributing said policy 17 to the one or more Connectors 30 that convert and store non-sensitive token date data on a hard disk In some embodiments, the Connector is selected from the set comprising: a C SDK, a C++ SDK, a Java SDK, a .NET core SDK, a Vaultless Tokenization server, a RESTful Crypto container, Data Protection Gateway and a Database Transparent gateway. The connector comprises one or more processors and memory coupled to the one or more processors, wherein the memory includes one or more partitions and computer instructions which when executed by the one or more processors causes the one or more processors to perform said steps and operations.

In other embodiments, a Kernel Driver is provided as a piece of software that enables communication between an operating system (OS) and specific hardware devices, for example the OS of a virtual machine of a container 30 or connector 40 on which the Computer Agent 20 executes in accordance with its data protection and encryption policy, including date tokenization parameters. The Memory 25 is system memory, such as physical RAM or even virtual memory, which is separate from a storage device, such as a hard drive or disc. The Memory 25 provides for system storage including the cache of system applications 15, for example, instructions and data the machine needs to execute programs and processes, and also the date table 51 and shuffled date table 52 as it is being generated. For security, date tables 51/52 are created as virtual files in memory 25 dynamically. These virtual files are created in a directory of the memory 25 which looks like normal "physical" files to any user or application, but these "virtual" files will not reside on a physical disk.

Here, the term "physical" files refer to actual data files that reside on a hard disk, hard drive, storage device, solid state, flash or other non-volatile memory. In contrast, a "virtual" file like a date table 52 consists only of defining structures that reside in memory 25, for example, system memory, RAM or other volatile memory. In either case, virtual files are perceived as being implemented within a layered file system (LFS) filter driver design. The virtual files consist of structures in memory which define their attributes names and locations which can be presented to the user in such a way to provide protection of date table attributes in memory.

Briefly, the Computer Agent 20 and associated modules (e.g. Container 30, Connector 40, RNG 58, Quick Unsort 60, etc.) can include one or more processors and memory coupled to the one or more processors, wherein the memory includes computer instructions which when executed by the one or more processors causes the one or more processors to perform the method steps and operations described. They may be connected over the network to other machines via a network communication device interface. Dedicated hardware implementations including, but not limited to, application specific integrated circuits, programmable logic arrays and other hardware devices can likewise be constructed to implement the systems, devices and methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

Figure 6:
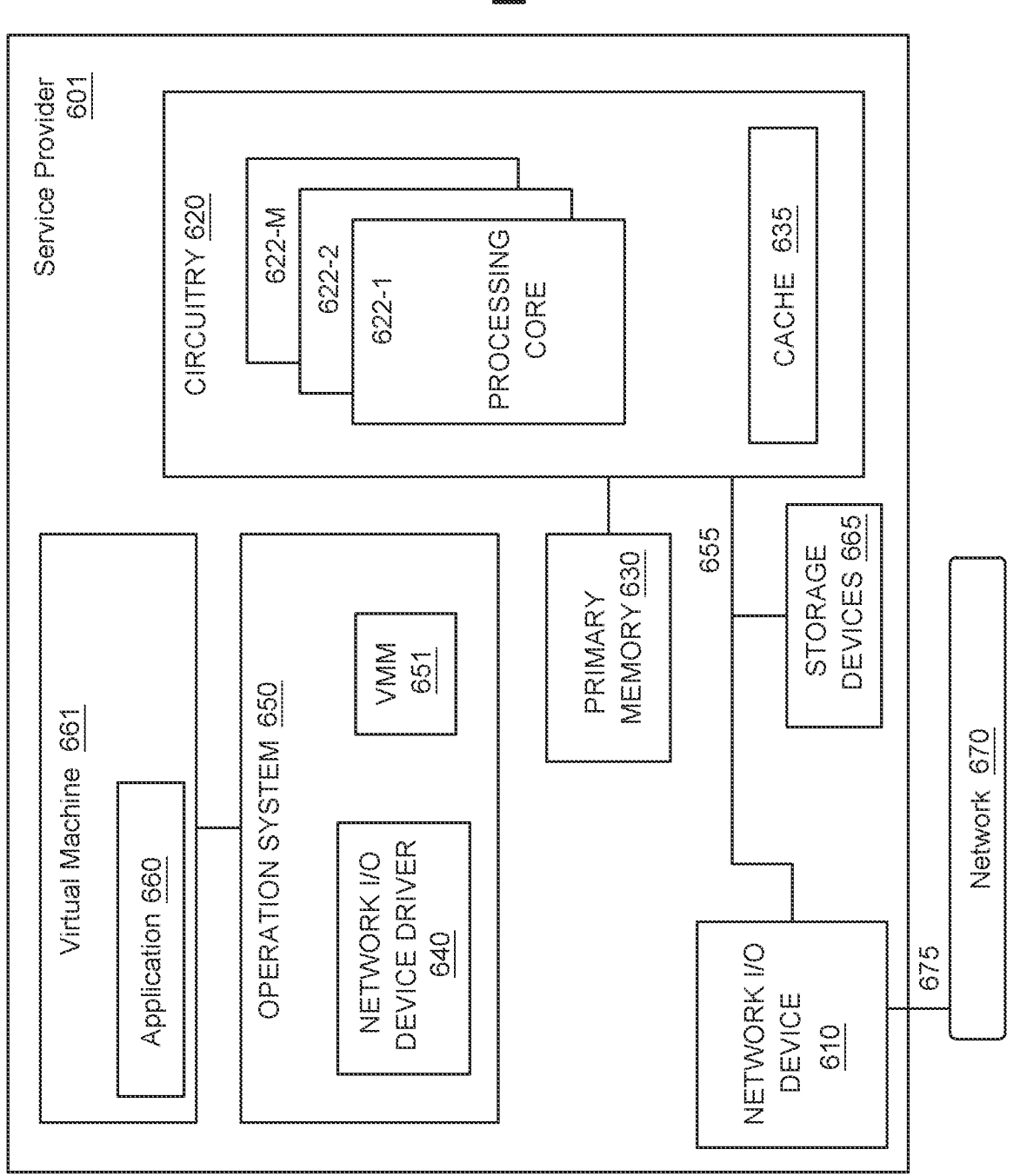
FIG. 6 illustrates an example of a computing system suitable for use with format preserving tokenization of calendar dates in accordance with some embodiments.

FIG. 6 shows a service provider 601 that includes circuitry 620, primary memory 630, operating system (OS) 650, Network (NW) I/O device driver 640, virtual machine manager (VMM) (also known as a hypervisor) 651, at least one application 660 running in a virtual machine (VM) 661, and one or more storage devices 665. In one embodiment, OS 650 is Linux™. In another embodiment, OS 650 is Windows® Server. Other OSs may also be used. In an embodiment, application 660 comprises one or more of a cloud license manager service having one or more smart license automatic detach policies. Network I/O device driver 640 operates to initialize and manage I/O requests per-formed by network I/O device 610. In an embodiment, packets and/or packet metadata transmitted to network I/O device 610 and/or received from network I/O device 610 are stored in one or more of primary memory 630 and/or storage devices 665.

In some embodiments, the service provider 601 provides the infrastructure for the the the data-centric system 100 of FIG. 1 for safeguarding and securing data that includes format preserving tokenization of calendar dates in data, including, but not limited to, HSMs, 10, Computer Agent 20, Applications 15, and Components 30, and also Connectors 40 in FIG. 2.

In at least one embodiment, storage devices 665 may be one or more of hard disk drives (HDDs) and/or solid-state drives (SSDs). In an embodiment, storage devices 665 may be non-volatile memories (NVMs).

In some examples, as shown in FIG. 6, circuitry 620 may communicatively couple to network I/O device 610 via communications link 655. In one embodiment, communications link 655 is a peripheral component interface express (PCIe) bus conforming to version 3.0 or other versions of the PCIe standard published by the PCI Special Interest Group (PCI-SIG).

In some embodiments, the storage devices 665 is a disk storage for storing non-sensitive data such as the format preserving tokens representing date date, and associated encrypted data related to primary account numbers (PANs) or personally identifiable information (PII).

In some examples, operating system 650, network I/O device driver 640, VM 661, and application 660 are implemented, at least in part, via cooperation between one or more memory devices included in primary memory 630 (e.g., volatile or non-volatile memory devices), storage devices 665, and elements of circuitry 620 such as processors with processing cores 622-1 to 622-$m$, where "m" is any positive whole integer greater than 2. In an embodiment, OS 650, VMM 651, network I/O device driver 640, VM 661 and application 660 are executed by one or more processing cores 622-1 to 622-$m$.

In some embodiments, the HSMs, 10, Computer Agent 20, Applications 15, and Components 30, and also Connectors 40 comprise one or more processors, with processing cores, and memory coupled to the one or more processors, wherein the memory includes one or more partitions and computer instructions which when executed by the one or more processors causes the one or more processors to perform said steps and operations described herein.

In some examples, service provider 601, includes but is not limited to a server, a server array or server farm, a web server, a network server, an Internet server, a work station, a mini-computer, a main frame computer, a supercomputer, a network appliance, a web appliance, a distributed computing system, multiprocessor systems, processor-based systems, a laptop computer, a tablet computer, a smartphone, a system-on-a-chip (SoC), or a combination thereof. In one example, service provider 601 is a disaggregated server. A disaggregated server is a server that breaks up components and resources into subsystems (e.g., network sleds). Disaggregated servers can be adapted to changing storage or compute loads as needed without replacing or disrupting an entire server for an extended period of time. A server could, for example, be broken into modular compute, I/O, power and storage modules that can be shared among other nearby servers.

Circuitry 620 having processing cores 622-1 to 622-$m$ may include various commercially available processors, including without limitation Intel® Atom®, Celeron®, Core (2) Duo®, Core i: 3, 5, 7 and 9, Itanium®, Pentium®, Xeon® or Xeon Phi® processors, ARM processors, and similar processors. Circuitry 620 may include at least one cache 635 to store data.

In some embodiments, data table 51 and shuffled data table 52 and associated index ordering lists are stored in cache for faster processing and secrecy. The generated tables are pinned in memory, not stored on disk and encrypted with a key unique to each installation-derived from a proprietary secret and installation specific details According to some examples, primary memory 630 may be composed of one or more memory devices or dies which may include various types of volatile and/or non-volatile memory. Volatile types of memory may include, but are not limited to, dynamic random-access memory (DRAM), static random-access memory (SRAM), thyristor RAM (TRAM) or zero-capacitor RAM (ZRAIVI). Non-volatile types of memory may include byte or block addressable types of non-volatile memory having a 3-dimensional (3-D) cross-point memory structure that includes chalcogenide phase change material (e.g., chalcogenide glass) hereinafter referred to as "3-D cross-point memory". Non-volatile types of memory may also include other types of byte or block addressable non-volatile memory such as, but not limited to, multi-threshold level NAND flash memory, NOR flash memory, single or multi-level phase change memory (PCM), resistive memory, nanowire memory, ferroelectric transistor random access memory (FeTRAM), magneto-resistive random-access memory (MRAM) that incorporates memristor technology, spin transfer torque MRAM (STT-MRAM), or a combination of any of the above. In another embodiment, primary memory 630 may include one or more hard disk drives within and/or accessible by service provider 601.

Figures 7, 8:
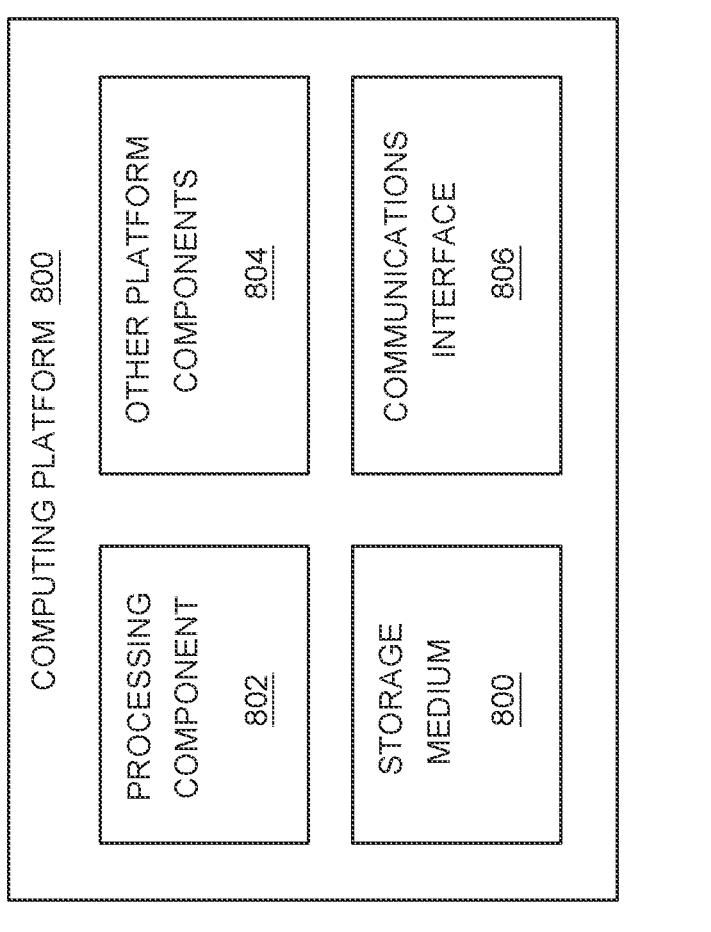
FIG. 7 illustrates an example of a storage medium suitable for use with format preserving tokenization of calendar dates in accordance with some embodiments.
FIG. 8 illustrates an example of a computing platform suitable for use with format preserving tokenization of calendar dates in accordance with some embodiments.

FIG. 7 illustrates an example of a storage medium 700. Storage medium 700 may comprise an article of manufacture. In some examples, storage medium 700 may include any non-transitory computer readable medium or machine readable medium, such as an optical, magnetic or semiconductor storage. Storage medium 700 may store various types of computer executable instructions, such as instructions 702 to implement method steps and logic flows described in the above figures. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

In accordance with various embodiments of the present disclosure, the methods described herein are intended for operation as software programs running on a computer processor or integrated on-chip code within static memory. Furthermore, software implementations can include, but not limited to, distributed processing or component/object distributed processing, parallel processing, or virtual machine processing can also be constructed to implement the methods described herein.

FIG. 8 illustrates an example computing platform 800. In some examples, computing platform 800 may include a processing component 802, other platform components 804 and/or a communications interface 806. According to some examples, processing component 802 may execute processing operations or logic for instructions stored on storage medium 700. Processing component 802 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 804 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), types of non-volatile memory such as 3-D cross-point memory that may be byte or block addressable. Non-volatile types of memory may also include other types of byte or block addressable non-volatile memory such as, but not limited to, multi-threshold level NAND flash memory, NOR flash memory, single or multi-level PCM, resistive memory, nanowire memory, FeTRAM, MRAM that incorporates memristor technology, STT-MRAM, or a combination of any of the above. Other types of computer readable and machine-readable storage media may also include magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 806 may include logic and/or features to support a communication interface. For these examples, communications interface 806 may include one or more communication interfaces that operate according to various communication protocols or standards to communicate over direct or network communication links or channels. Direct communications may occur via use of communication protocols or standards described in one or more industry standards (including progenies and variants) such as those associated with the peripheral component interconnect express (PCIe) specification. Network communications may occur via use of communication protocols or standards such those described in one or more Ethernet standards promulgated by the Institute of Electrical and Electronics Engineers (IEEE). For example, one such Ethernet standard may include IEEE 802.3. Network communication may also occur according to one or more OpenFlow specifications such as the OpenFlow Switch Specification.

The components and features of computing platform 800, including logic represented by the instructions stored on storage medium 700 may be implemented using any combination of discrete circuitry, ASICs, logic gates and/or single chip architectures. Further, the features of computing platform 800 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

In some embodiments, the data-centric system 100 of FIG. 1 is technically enabled by way of one or more computing platforms 800 for safeguarding and securing data that includes format preserving tokenization of calendar dates in data, including, but not limited to, HSMs, 10, Computer Agent 20, Applications 15, and Components 30, and also Connectors 40 in FIG. 2. It should be appreciated that the exemplary computing platform 800 shown in the block diagram of FIG. 8 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASIC, programmable logic devices (PLD), digital signal processors (DSP), FPGA, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, remov-able or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Included herein are logic flows or schemes representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow or scheme may be implemented in software, firmware, and/or hardware. In software and firmware embodiments, a logic flow or scheme may be implemented by computer executable instructions stored on at least one non-transitory computer readable medium or machine readable medium, such as an optical, magnetic or semiconductor storage. The embodiments are not limited in this context.

Some examples are described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

What is claimed, is:
1. A system for format preserving tokenization of calendar dates in data suitable for use in a data-centric ecosystem for safeguarding and securing data as it moves from networks to applications and a cloud, the system comprising:

a Computer Agent with centrally defined global parameters in a global protection policy; and one or more Connectors communicatively coupled to the Computer Agent for managing and distributing the global protection policy to the one or more Connectors that convert and store non-sensitive token date data on a hard disk, wherein said one or more Connectors performs steps for:

reading said global parameters from the global protection policy; generating a date look-up table using said global parameters;

shuffling said date look-up table by way of a quick unsort to ensure secrecy and produce a shuffled date look-up table; and selectively:

tokenizing date entries of sensitive date data via said shuffled date look-up table to produce said non-sensitive token date data, wherein said tokenizing comprises:

retrieving a date format, a date range, an encryption key and a tweak value from said global parameters in the global protection policy;

generating said date lookup table with all possible dates in said date format in the date range;

seeding a Random Number Generator with said date range, said encryption key and said tweak to produce a seeded RNG; and shuffling said date lookup table in accordance with an output of said Random Number Generator; and detokenizing said non-sensitive token date data via said shuffled date look-up table to produce said date entries of the sensitive date data, wherein said data look-up table and shuffled date look-up table are pinned in system memory and not stored on said hard disk, and encrypted with a key unique to each installation of said one or more Connectors, wherein said Computer Agent and one or more Connectors comprise one or more processors and memory coupled to the one or more processors, wherein the memory includes one or more partitions and computer instructions which when executed by the one or more processors causes the one or more processors to perform said steps and operations.

2. The system of claim 1, wherein said quick unsort takes two date entries in the date lookup table for comparison, and instead of deciding of whether to swap positions of the two date entries in ascending or descending order based on their value, the quick unsort makes a pseudo random decision based on an output of said seeded RNG to either swap said positions or not swap positions of said two date entries.

3. The system of claim 2, wherein the shuffled date look-up table is unsorted with a pseudo random swap decision such that date entries are neither ascending nor descending order, wherein said shuffled date look-up table is configurable for two-way tokenizing and de-tokenizing data, and one-way tokenizing anonymous use-cases.

4. The system of claim 3, wherein on tokenization:

plaintext date is computed into an index for lookup in said shuffled date look-up table; and an entry in a table position of said shuffled date look-up table is returned to a user as said non-sensitive token date data.

5. The system of claim 4, wherein on detokenization: said non-sensitive token date data is looked up in said shuffled date look-up table to identify a position therein; and said position is used to compute said plaintext date and returned to the user as the sensitive date data.

6. The system of claim 1, wherein said quick unsort generates said individual look-up tables independently on each connector rather than relying on a centralized server or database that generates and replicates a look-up table for distribution to said one or more Connectors.

7. The system of claim 1, wherein a container associated with said one or more Connectors determines whether data is personally identifiable information (PII);

and if so, tokenizes date entries of sensitive data to produce non-sensitive token date data stored on said hard disk;

and if not, does not tokenize date entries of non-sensitive data.

8. The system of claim 1, wherein said date look-up table and shuffled date look-up table are pinned in system memory comprising physical RAM or virtual memory that is distinct and separate from said disk, or a storage device comprising a hard drive.

9. The system of claim 1, wherein said one or more Connectors are selected from the set comprising: a C SDK, a C++ SDK, a Java SDK, a .NET core SDK, a Vaultless Tokenization server, a RESTful Crypto container, Data Protection Gateway and a Database Transparent gateway.

10. A Connector communicatively coupled to a Computer Agent for managing and distributing a global protection policy to the Connector to convert and store non-sensitive token date data on a hard disk, for format preserving tokenization of calendar dates in data, and individually perform steps of:

reading global parameters from the global protection policy received from Computer Agent;

generating a date look-up table using said global parameters;

shuffling said date look-up table by way of a quick unsort to ensure secrecy and produce a shuffled date look-up table; and selectively:

tokenizing date entries of sensitive date data via said shuffled date look-up table to produce non-sensitive token date data, wherein said tokenizing comprises:

retrieving a date format, a date range, an encryption key and a tweak value from said global parameters in the global protection policy;

generating said date lookup table with all possible dates in said date format in the date range;

seeding a Random Number Generator with said date range, said encryption key and said tweak to produce a seeded RNG; and shuffling said date lookup table in accordance with an output of said Random Number Generator; and detokenizing said non-sensitive token date data via said shuffled date look-up table to produce said date entries of sensitive date data, wherein said data look-up table and shuffled date look-up table are pinned in system memory and not stored on said hard disk, and encrypted with a key unique to each installation of one or more Connectors, wherein said Connector is among the one or more Connectors communicatively coupled to a Computer Agent for managing and distributing the global protection policy to the one or more Connectors that convert and store non-sensitive token date data on a hard disk.

11. The Connector of claim 10, is selected from the set comprising: a C SDK, a C++ SDK, a Java SDK, a .NET core SDK, a Vaultless Tokenization server, a RESTful Crypto container, Data Protection Gateway and a Database Transparent gateway.

12. The Connector of claim 10, comprises one or more processors and memory coupled to the one or more processors, wherein the memory includes one or more partitions and computer instructions which when executed by the one or more processors causes the one or more processors to perform said steps and operations.

13. The Connector of claim 10, further comprising a date tokenizer, wherein said tokenizing comprises: computing a number of dates (n) existing in a given date range, comprising start year, end year; containing numbers from 0 to n in ascending order in an index column, wherein said numbers (0 to n) correspond to an offset of each date in a date range, in a date offset column; and shuffling the date offset column with said quick unsort such that a new position of each record in the shuffled date look-up table becomes an index in the index entry column thereby producing the shuffled date look-up table; storing only data for the date offset column of the shuffled date look-up table in system memory; and, said detokenizing comprises: receiving a plaintext date and calculating an offset in the given date range; looking up a record located at an index corresponding to the offset in the detokenization date look-up table; and transforming this record from a date offset to an actual date by adding the offset to a start year of the given date range to produce the day, month and year.

14. The Connector of claim 10, wherein said date tokenizer finds an entry in the shuffled date look-up table with an index equal to the offset, and transforms this entry from a date offset to an actual date by adding the offset to a start year of the given date range, to produce the day, month and year in plaintext.

\* \* \* \* \*